Patented July 20, 1954

2,684,355

UNITED STATES PATENT OFFICE 2,684,355

COPOLYMERS OF ITACONATES AND ACRYLATES

William L. Van Horne, Cheltenham, Harry T. Neher, Bristol, and La Verne N. Bauer, Philadelphia, Pa., assignors to Rohm & Haas Company, Philadelphia, Pa., a corporation of Delaware No Drawing. Application April 29, 1952, Serial No. 285,083

6 Claims. (Cl. 260—78.5)

This invention concerns copolymers of dialkyl esters of itaconic acid and alkyl esters of acrylic acid which are effective agents for depressing the pour point of wax-containing petroleum oils. It also deals with compositions comprising a wax-containing hydrocarbon liquid having dissolved therein a said copolymer in an amount sufficient to depress the pour point of the said liquid. With greater particularity this invention relates to copolymers more closely defined below and oily compositions containing them, the copolymers containing two different sizes of alkyl groups, as alcohol residues, one size having carbon chains of 16 to 18 carbon atoms and the other having a carbon chain of 12 carbon atoms, the ratio of the former to the latter varying from 1:1 to 1:5 on a group basis.

While it has been suggested that various resinous or polymeric materials be dissolved in oils for a variety of purposes, it is an unusual occurrence for these materials to cause a useful or practical lowering of the pour point of the oils in which the said materials are dissolved. A common effect of dissolved polymers is to increase the viscosity of the oil solution. Some materials improve the viscosity-temperature relations of oils. Parallel to the increase in viscosity the pour point is frequently raised. Many times the pour point remains unchanged. Occasionally it is lowered, but this cannot be accurately predicted.

Polymers of dihexyl itaconate, dioctyl itaconate, didodecyl itaconate, dicetyl itaconate, dioctadecyl itaconate, didocosyl itaconate, octyl acrylate, decyl acrylate, dodecyl acrylate, cetyl acrylate, and octadecyl acrylate have been found not to depress the pour point of typical wax-containing oils. Likewise, mixtures of individual polymers fail to lower pour points of wax-containing oils. In contrast to this situation we have found that copolymers of itaconates and acrylates are very effective and valuable pour depressants when in the copolymer there is a defined balance of large alkyl groups (i. e. alkyl groups having a chain of 16 to 18 carbon atoms) and a smaller alkyl group, most effectively the dodecyl group. In the copolymers of this invention it is not a critical factor whether the large alkyl group is attached to the itaconate residue or the acrylate residue. It is essential that at least 15–17% of the copolymer be an alkyl group of 16 to 18 carbon atoms and on the other hand that at least 30–32% of the copolymer be the dodecyl group or its equivalent. From a slightly different approach the copolymers must be formed from mixtures of alkyl acrylates and dialkyl itaconates wherein either one of these makes up at least 20% of the mixture and the other substantially the balance.

Methods are known for preparing such esters as didodecyl itaconate, dodecyl acrylate, dicetyl itaconate, cetyl acrylate, dioctadecyl itaconate, and octadecyl acrylate, and like esters. In general they can be prepared by esterification of the respective acids with an alcohol. The alcohol may be a pure alcohol or one of the commercial alcohols prepared, for example, from natural products and fractionated to a major content of a particular alcohol.

Esters of the several types may also be prepared through known methods involving alcoholysis or transesterification, starting from lower alkyl esters and replacing the small alkyl group thereof with an alkyl group or groups of 12 to 18 carbon atoms.

The copolymers of this invention are formed by mixing an alkyl acrylate and a dialkyl itaconate, the alkyl groups representing both dodecyl groups and hexadecyl to octadecyl groups, in amounts to yield a required proportion of the two sizes of these groups. A polymerization catalyst is added to the mixture and copolymerization is initiated usually by heating the mixture best under an inert atmosphere. Copolymerization may most conveniently be effected in an inert organic solvent such as benzene, toluene, xylene, naphtha, an oil, or the like.

As catalysts for effecting copolymerization there are used acyclic azo compounds, such as azodiisobutyronitrile or dimethyl azodissobutyrate, or organic peroxides or other active free radical catalyst. Typical peroxide catalysts are acetyl peroxide, caproyl peroxide, lauroyl peroxide, benzoyl peroxide, dibtuyl diperphthalate, tert.-butyl perbenzoate, methyl ethyl ketone peroxide, di-tert.-butyl peroxide, tert.-butyl hydroperoxide, and so on.

Amounts of catalyst used may vary from about 1% to 15% of the weight of the mixed monomers. In a preferred method a small amount of catalyst is used at the start and catalyst is added from time to time as copolymerization proceeds. Solvent may likewise be added as copolymerization progresses. Copolymerization is usually accomplished at temperatures between 60° and 150° C. Best temperatures for copolymerization will depend on the mixture of monomers, the solvent, concentration of monomers and of catalyst, copolymerization schedule, size of copolymer desired, and similar considerations, which are now understood in the art.

Typical preparations of copolymers are described in some detail in the following illustrative examples.

*Example 1*

There were mixed 8 parts of cetyl acrylate, 12 parts of dilauryl itaconate, 0.5 part of benzoyl peroxide, and 5 parts of toluene. This mixture was slowly charged over 1.8 hours to a reaction vessel equipped with stirrer, reflux condenser, inlet tube through which nitrogen gas flowed, and an oil bath. At the start the temperature was 118° C. and during the addition it was held between 113° and 116° C. At 3 hours it was allowed to fall to 110° C. and at 4.5 hours to 105°–103° C., at which level it was maintained until the end of 8 hours. Additions of benzoyl peroxide and toluene were made from time to time as follows: at 3 hours, 0.2 part of peroxide and 4 parts of toluene; at 4.7 hours, 0.5 part of the peroxide and 4 parts of toluene; at 5.75 hours, 0.2 part of benzoyl peroxide; at 6.75 hours, 0.08 part of peroxide; and at 7.75 hours, 20 parts of toluene. The product was a clear, viscous solution of 45.2% of copolymer in toluene, a yield of 97.6%. A 30% solution of this copolymer in toluene had a viscosity of 35 centistokes at 100° F.

The copolymer was transferred to a light neutral oil by mixing the toluene solution and oil and heating the mixture to 140° C./20 mm. There was thus prepared a solution of 38.2% of copolymer in oil. This was used as an additive for wax-containing oils. At 0.5% of this copolymer in an oil having a normal pour point of +25° F. the pour point was lowered by 50° F.

In the above copolymer the mole ratio of cetyl acrylate to dilauryl itaconate is 1:0.954 and the ratio of cetyl to lauryl groups is 1:1.91.

*Example 2*

In the same way there was copolymerized a mixture of 11.2 parts of cetyl acrylate, 8.8 parts of di-n-dodecyl itaconate, 0.01 part of benzoyl peroxide and 5 parts of toluene, starting at 117° C., and continuing at 112° C. and then at 104° C. for a total of 7.5 hours. Several additions amounting to 0.025 part of benzoyl peroxide and 19 parts of toluene were made. There was thus obtained a 43.7% solution of copolymer in toluene, a 95% yield. A 30% solution of this copolymer in toluene had a viscosity of 5.9 centistokes at 100° F. In a 150 neutral oil of +25° F. pour point it depressed the pour point 40° F. at 0.5%.

In this copolymer there is a group ratio of 1:1. With a group ratio of 1:0.5 the pour point was not depressed.

*Example 3*

In the same way there was copolymerized a mixture of 7 parts of di-n-octadecyl itaconate, 13 parts of lauryl acrylate, 0.4 part of benzoyl peroxide, and 10 parts of toluene. Copolymerization was started with the temperature maintained at 110°–114° C. and then at 103°–106° C. Total time of copolymerization was 6.75 hours. Additions were made from time to time to bring the total of benzoyl peroxide used to 1.18 parts and of toluene to 14.5 parts. The product was a clear viscous solution containing 53.6% of copolymer, a yield of 92.4%. A 30% solution of copolymer in toluene had a viscosity of 69.8 centistokes at 100° F. In a 150 neutral oil having a normal pour point of +25° F. it depressed the pour point by 40° F. at 0.5%. The ratio of groups in the above copolymer is 1:2.4.

*Example 4*

In the same way there was copolymerized a mixture of 30.5 parts of di-n-octadecyl itaconate and 69.5 parts of lauryl acrylate (an apparent 1:3 group ratio), the lauryl group here being obtained from a commercial alcohol having an n-dodecyl content of 65% with other alcohols from $C_8$ to $C_{18}$. When this copolymer was dissolved in a wax-containing oil, it lowered the pour point by 65° F.

A similar preparation from 18 parts of di-n-octadecyl itaconate and 82 parts of the same lauryl acrylate (an apparent 1:9 ratio) lowered the pour point only slightly and was not a practical or effective pour point depressant. A similar copolymer from pure dodecyl acrylate raised the pour point about 5° F. at 0.5% of copolymer.

Tests of various copolymers prepared as above were made over a range of concentrations in a Pennsylvania 150 neutral oil having a pour point of +25° F. and a viscosity index of 106.9. The standard A. S. T. M. pour test method (D97–47) was used.

A copolymer from di-n-octadecyl itaconate and pure n-dodecyl acrylate, in a 1:6 mole ratio or with a 1:3 group ratio, gave the following pour points for the test oil: at 0.5% −40° F., at 0.25% −30° F., at 0.1% −15° F., and at 0.04% +5° F.

A copolymer from n-octadecyl acrylate and di-n-dodecyl itaconate with a 1:2.6 mole ratio gave the following results: at 0.5% −20° F., at 0.25% −20° F., at 0.1% −20° F., and at 0.04% −10° F. At 0.1% in an S. A. E. 90 gear oil this copolymer reduced the pour point from +25° F. to −5° F.

A copolymer of cetyl acrylate and didodecyl itaconate with a group ratio of 1:2 depressed the pour point of the test oil as follows: at 0.5% −25° F., at 0.25% −20° F., at 0.1% −20° F., and at 0.04% −15° F. In an S. A. E. 90 gear oil at 0.1% the pour point was reduced by 30° F.

A copolymer of cetyl acrylate and didodecyl itaconate with a 1:1 group ratio gave pour points as follows: at 0.5% to 0.1% −15° F. and at 0.04% −10° F.

A copolymer of dioctadecyl itaconate and lauryl acrylate with a group ratio of 1:2.3 at 0.5% gave a pour point of −15° F., at 0.25% of −10° F., at 0.1% of −10° F., and at 0.04% of −5° F. In the S. A. E. 90 gear oil at 0.1% it depressed the pour point by 30° F.

A copolymer of dihexadecyl itaconate and dodecyl acrylate with a ratio of hexadecyl groups to dodecyl groups of 1:3 gave a pour point of −40° F. at 0.5%, −35° F. at 0.25%, −30° F. at 0.1% and −10° F. at 0.04%.

Change of pour point was observed with change in ratio of octadecyl groups to dodecyl groups in copolymers of di-n-octadecyl itaconate and n-dodecyl acrylate. The following pour points were found at a constant level of copolymer (0.5%): −10° F. at 1:1, −40° F. at 1:2, −40° F. at 1:3, −35° F. at 1:4, −15° F. at 1:5, and +5° F. at 1:6.

Change of pour point was also observed with changing ratios of cetyl groups to dodecyl groups in a series of cetyl acrylate-di-n-dodecyl itaconate copolymers. Pour point data were as follows at 0.5% of copolymer: −15° F. at 1:1, −35° F. at 1:2, −40° F. at 1:3, −15° F. at 1:5, and +25°

F. at 1:6.5. The pour points are lower with increasing proportions of dodecyl groups when the higher alcohols used in preparing the two types of esters are less pure containing mixtures of higher alcohols.

The copolymers of this invention can be varied over a wide range of molecular sizes with retention of their marked effectiveness in reducing the pour point of wax-containing oils. Molecular sizes vary from the order of several thousand to an order of 40,000 or more. The viscosities of solutions of the copolymers are approximately parallel to the sizes.

The copolymers as they become of larger molecular size tend to thicken the oils more and more in which they are dissolved and to improve the viscosity index of the oil.

The test oil has viscosities of 5.15 centistokes at 210° F. and 30.9 centistokes at 100° F., the V. I. being 106.9. A 0.5% solution of a copolymer of dioctadecyl itaconate and lauryl acrylate had viscosities of 5.85 centistokes at 210° F. and 35.01 centistokes at 100° F., giving a V. I. of 119.7. At 2% of copolymer in the test oil the viscosities were 8.71 centistokes at 210° F. and 51.86 centistokes at 100° F., giving a V. I. of 138.0. A toluene solution containing 25% of this copolymer had a viscosity of 178 centistokes at 100° F.

A cetyl acrylate-dilauryl itaconate copolymer which imparted a viscosity of 61 centistokes at 100° F. to a 30% toluene solution was also examined in the test oil at 2%. This solution had viscosities of 5.90 centistokes at 210° F. and 35.51 centistokes at 100° F., giving a V. I. of 119.5.

A useful range for copolymers of this invention dissolved in a wax-containing hydrocarbon fluid is from about 0.01% to about 5%, the amount being sufficient to provide a definite lowering of the pour point of the fluid.

We claim:

1. An oil-soluble copolymer of a dialkyl itaconate and alkyl acrylate in which there are only two kinds of alkyl groups, (1) alkyl groups having chains of 16 to 18 carbon atoms and (2) alkyl groups having a chain of 12 carbon atoms, the ratio of alkyl groups of 16 to 18 carbon atoms to alkyl groups of 12 carbon atoms being from 1:1 to 1:5, units from one of the above esters forming at least 20% of a said copolymer and units from the other ester being present in an amount to make 100%.

2. An oil-soluble copolymer of a dialkyl itaconate, the alkyl groups of which contain chains of 16 to 18 carbon atoms, and dodecyl acrylate, the ratio of said alkyl groups of 16 to 18 carbon atoms to dodecyl groups therein being from 1:1 to 1:5.

3. An oil-soluble copolymer of dioctadecyl itaconate and dodecyl acrylate wherein the ratio of octadecyl groups to dodecyl groups is from 1:1 to 1:5.

4. An oil-soluble copolymer of an alkyl acrylate, the alkyl groups of which contain chains of 16 to 18 carbon atoms, and didodecyl itaconate, the ratio of said alkyl groups of 16 to 18 carbon atoms to dodecyl groups being from 1:1 to 1:5.

5. An oil-soluble copolymer of octadecyl acrylate and didodecyl itaconate, wherein the ratio of octadecyl groups to dodecyl groups is from 1:1 to 1:5.

6. An oily-soluble copolymer of cetyl acrylate and didodecyl itaconate, wherein the ratio of cetyl groups to dodecyl groups is from 1:1 to 1:5.

References Cited in the file of this patent

UNITED STATES PATENTS

| Number | Name | Date |
|---|---|---|
| 2,279,883 | D'Alelio | Apr. 14, 1942 |
| 2,543,964 | Giammaria | Mar. 6, 1951 |
| 2,580,053 | Tutwiler et al. | Dec. 25, 1951 |
| 2,600,449 | Van Horne et al. | June 17, 1952 |